United States Patent [19]

Van Gompel

[11] Patent Number: 4,529,345
[45] Date of Patent: Jul. 16, 1985

[54] CARGO RESTRAINING DEVICE FOR HIGH DENSITY LOADING OF SHIPPING DRUMS

[75] Inventor: James J. Van Gompel, Fremont, Ind.

[73] Assignee: N P Marketing Corporation, Neenah, Wis.

[21] Appl. No.: 545,627

[22] Filed: Oct. 26, 1983

Related U.S. Application Data

[63] Continuation-in-part of Ser. No. 510,431, Jul. 1, 1983.

[51] Int. Cl.³ .......................................... B61D 45/00
[52] U.S. Cl. ................................. 410/42; 108/51.1;
206/386; 206/504; 220/23.4; 410/52
[58] Field of Search ............................ 108/51.1, 55.3;
206/386, 504; 220/23.4; 410/31, 36, 42, 47, 52

[56] References Cited

U.S. PATENT DOCUMENTS

| | | | |
|---|---|---|---|
| 1,777,694 | 10/1930 | Halteman | 108/51.1 X |
| 1,820,281 | 8/1931 | Leslie | 108/51.1 |
| 2,100,483 | 11/1937 | Jesser | 206/504 |
| 2,443,684 | 6/1948 | Lazarus | 206/386 |
| 2,444,326 | 6/1948 | Baker et al. | 108/55.3 |
| 2,803,363 | 8/1957 | Hutchinson | 108/55.3 X |
| 3,217,892 | 11/1965 | Goodell | 410/42 X |
| 3,430,585 | 3/1969 | Grant et al. | 108/51.1 |
| 3,834,323 | 9/1974 | Weinmann | 108/51.1 |
| 4,263,855 | 4/1981 | Lawlor | 108/55.3 X |
| 4,317,645 | 3/1982 | Van Gompel | 410/94 |
| 4,403,556 | 9/1983 | Van Gompel | 108/55.3 |

FOREIGN PATENT DOCUMENTS 1166701 3/1964 Fed. Rep. of Germany ..... 108/51.1

Primary Examiner—Randolph A. Reese
Assistant Examiner—David F. Hubbuch
Attorney, Agent, or Firm—Stefan J. Klauber & Associates

[57] ABSTRACT

A device for securely restraining open head shipping drums during vehicular transport. The device comprises a platform member supported in spaced relation from an underlying floor, and having an upper load bearing surface for receiving a cargo load of open head shipping drums thereupon. An upright member is adjoined to one end of the platform member for effecting restraining contact with the adjacent side of the load seated on the platform member, the upright member including a generally planar member facing the load. The upper load bearing surface of the platform member is stepped to define first and second generally planar support levels at alternate sides of the platform member, whereby drums respectively supported on the first and the second levels are precluded from impact between their respective rims, upon side-to-side movement or swaying thereof.

7 Claims, 9 Drawing Figures

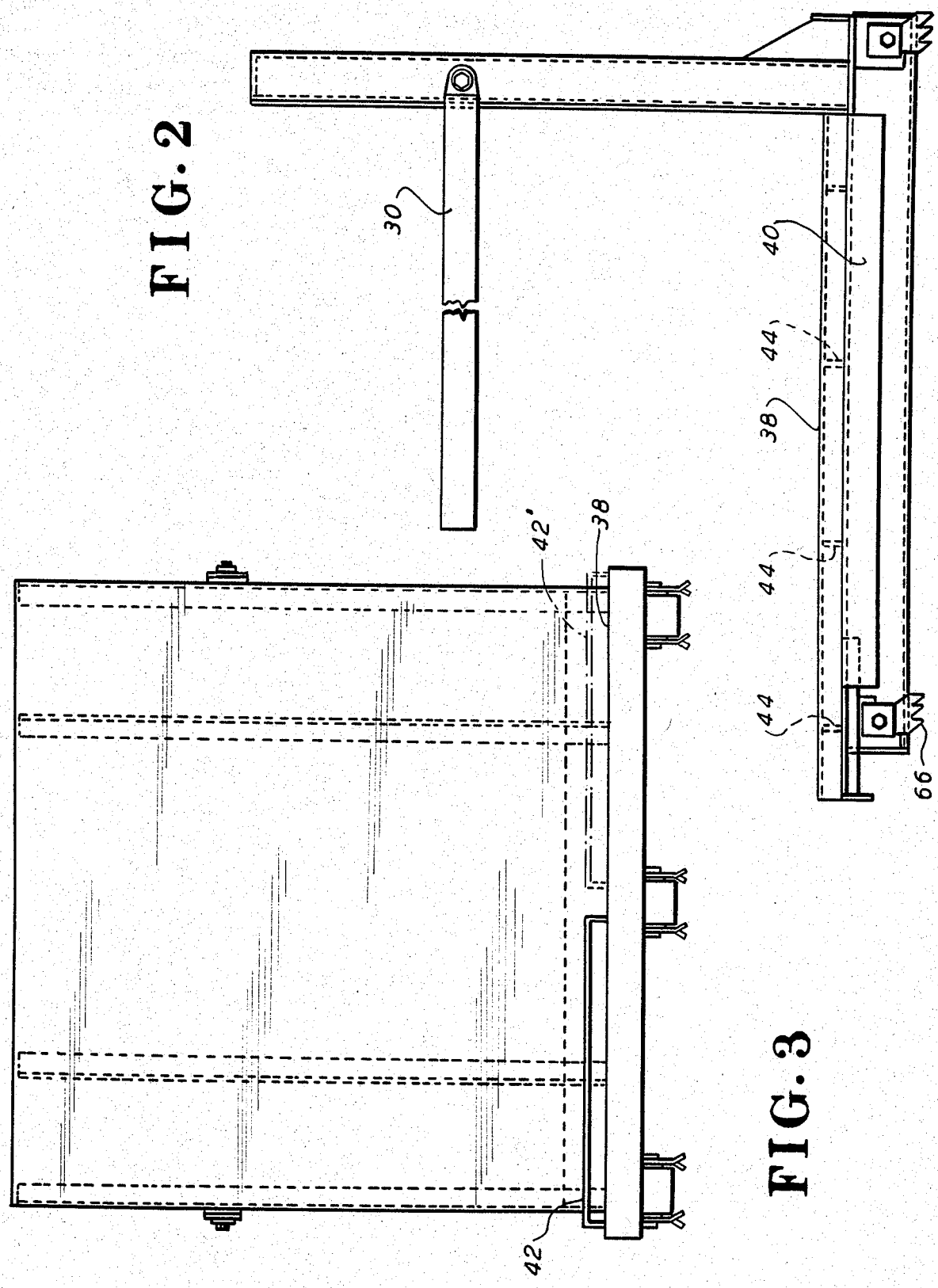

FIG. 6
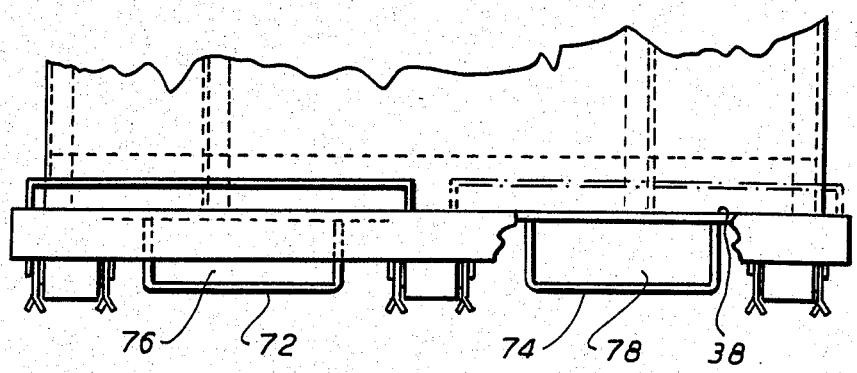
FIG. 7
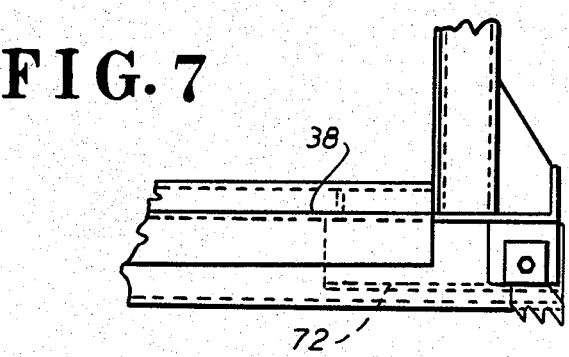
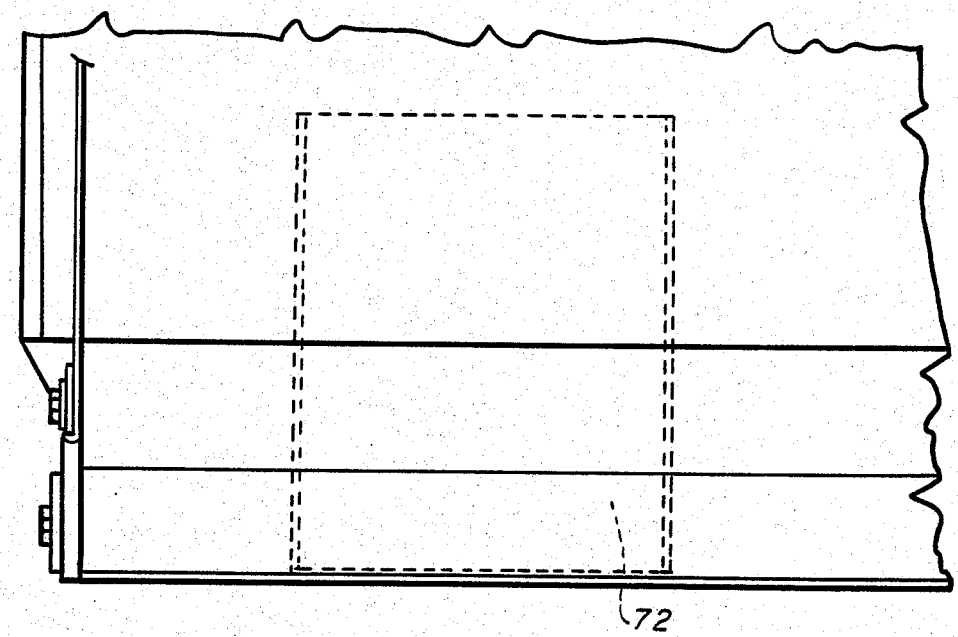
FIG. 8

CARGO RESTRAINING DEVICE FOR HIGH DENSITY LOADING OF SHIPPING DRUMS

BACKGROUND OF THE INVENTION

1. Related Applications

This application is a continuation-in-part of my co-pending application Ser. No. 510,431 filed July 1, 1983 for "CARGO RESTRAINING DEVICE FOR HIGH DENSITY LOADING".

2. Field of the Invention

This invention relates to a device for securely restraining cargo during transport, and in particular, to a device for securely restraining a high density load of shipping drums to prevent movement thereof which could result in damage. The invention is particularly applicable to so-called "open head" drums.

3. Background of the Invention

Unless a cargo load is adequately secured within its vehicular carrier, motion of the vehicle, especially including acceleration and deceleration of same, tends to move or shift the cargo with consequent damage to same, and often as well, damage to the carrier. Heretofore, shippers have generally found it necessary to rely on banding, blocking, or bracing to secure the cargo load and provide for its integrity. Such practices, however, are not only time-consuming to install and costly, but also rely heavily on individual judgement for their adequacy.

Within the last several years, a new class of devices have come into use which are generally useful in restraining loads of cargo during transport. These are exemplified by U.S. Pat. Nos. 4,147,112 and 4,317,645, each assigned to the assignee of the present application.

U.S. Pat. No. 4,147,112, issued to Green et al., thus relates to a cargo support or retainer which endeavors to avoid banding, blocking, or bracing of palletized cargo loads, by providing a substantially L-shaped frame, wherein the lower horizontal member which contacts the floor is provided with a plurality of "anti-skid" spikes to resist movement of the palletized load during transport.

A further such cargo restraining device is disclosed in said U.S. Pat. No. 4,317,645 issued to James Van Gompel. In this device, an elongated floor contacting member is provided with an upwardly facing load-bearing surface, the member being adapted to project forwardly beneath a portion of the cargo load. A generally upright member is secured to the floor contacting member in spaced relation from the forward end of the floor contacting member for engaging with the cargo load, and a floor piercing element is movably mounted on the floor contacting member adjacent to the rearward end thereof. The floor piercing element is normally disposed to pierce the floor when the floor contacting member of the restraining device is under load in service, and is movable to a position incapable of piercing the floor when the restraining device is out of service. Like the device disclosed in the Green et al. patent, this device is intended to resist movement of the palletized load during transport.

U.S. Pat. No. 3,699,900 to Carlson, also describes a device for use in the transport, handling and storage of materials. This device has a base portion and a first wall portion, either of which may be utilized in the lifting and transporting of the device. A pair of opposed spaced side panels are provided between the base portion and the first wall portion, for confining and protecting the material on said device.

These devices, while suitable for the transport of cargo requiring no special handling, can afford less than satisfactory safeguards against movement of portions of the cargo relative to one another which might result in damage to, or destruction of, the cargo. A particular problem is thus presented where very dense loads are involved. Under such circumstances the dense load can all too readily slide or shift laterally—i.e. despite the restraints against forward or rearward movement during front or rear impact of the vehicle carrier.

In the instance of open head drums a particularly difficult problem is presented. These drums are openable at the top and include a closeable lid, the periphery of which may present a somewhat enlarged chime. These drums are commonly used for shipment of particulate solids, and the contents can be of a hazardous nature—e.g. radioactive wastes or the like. If the said drums are shipped in simple side-by-side fashion, the top rims of adjacent drums can be in direct contact, whereby sudden movement of the drums can cause impact of the upper drum portions against one another, which can knock off the said lids, causing dangerous spillage of the drum contents. This dislodging of drum lids tends especially to occur as a result of side-to-side movement during shipment, in that the alignment of the successive drums in the direction of carrier movement is in normally uniform rows, whereas drum-to-drum spacing between drums in adjacent rows varies and allows greater displacement into the consequent voids.

OBJECTS OF THE INVENTION

In accordance with the foregoing, it may be regarded as an object of the present invention, to provide a device for use in restraining high density cargo loads during vehicular transport.

It is a further object of the invention to provide a cargo restraining device of the foregoing character, which is adapted to carry and restrain a plurality of open head drums in such mutual relationship as to minimize the likelihood of the lids of such drums being dislodged.

It is a further object of the invention, to provide a cargo restraining device of the foregoing character, which is adapted for very effectively restraining the high density cargo loads against side-to-side, i.e. lateral, sliding or shifting.

It is a still further object of the invention, to provide a cargo restraining device as aforesaid, which includes means which facilitate load manipulation by a conventional tow motor vehicle.

SUMMARY OF THE INVENTION

Now in accordance with the present invention, the foregoing objects, and others as will become apparent in the course of the ensuing specification, are achieved in a device for securely restraining open head drums during transport, comprising a platform member supported in spaced relation from an underlying floor, and having an upper load bearing surface for receiving a cargo load thereupon; an upright member being adjoined to one end of said platform member for effecting restraining contact with the adjacent side of the load seated on said platform member; said upright member including a generally planar member facing said load; and in which the upper load bearing surface of the platform member is stepped to define first and second generally planar support levels at alternate sides of said platform member, whereby drums respectively supported on said first and second levels are precluded from impact between their respective top rims upon side-to-side movement or swaying thereof.

The downwardly facing portion of the platform member may be provided with surface gripping projections, to limit movement of the cargo restraining device and load with respect to the underlying floor. These projections can comprise teeth provided at metal plates which are secured to the said member. The teeth may be sawtoothed in shape, and formed as rows at the lateral edges of the metal plates.

In a preferred embodiment of the device, two of the said support levels may be provided by a step which extends along the front to rear axis of symmetry thereof, to divide the space on the platform into two portions of differing height.

In accordance with a further aspect of the invention, the restraining device may include a pair of receiving pockets mounted below said load bearing surfaces and having openings facing the rear of said upright member, said openings being adapted to receive forklift forks to prevent the device from tipping off the said forks during movement of same by a forklift.

BRIEF DESCRIPTION OF THE DRAWINGS

The invention is diagramatically illustrated, by way of example, in the drawings appended hereto, in which:

FIG. 2 is a side elevational view of the device of FIGS. 1A and 1B;

FIG. 3 is a front elevational view of the device of FIGS. 1A and 1B;

FIG. 6 is a front elevational view similar to FIG. 3, but showing an embodiment of the invention which includes receiving pockets for the forks of a forklift;

FIG. 7 is a fragmentary elevational view of the lower rear corner of the FIG. 6 device; and FIG. 8 is a fragmentary plan view of the FIG. 6 device further depicting the arrangement of the receiving pockets.

DESCRIPTION OF THE PREFERRED EMBODIMENT

Figure 1A:
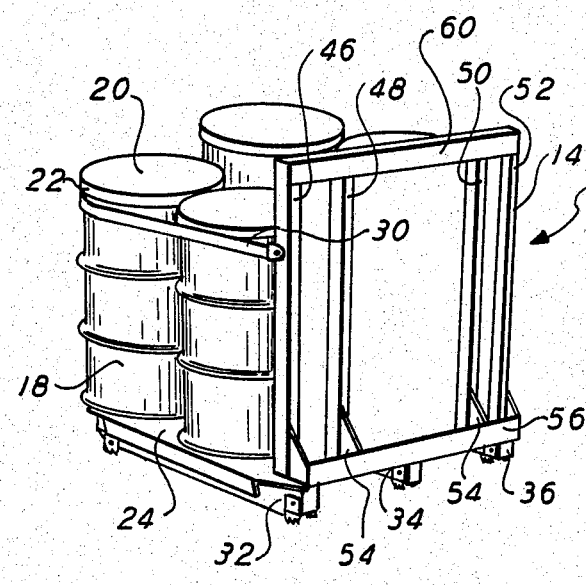
FIG. 1A is a rear end perspective view of a cargo restraining device according to the present invention.
Figure 1B:
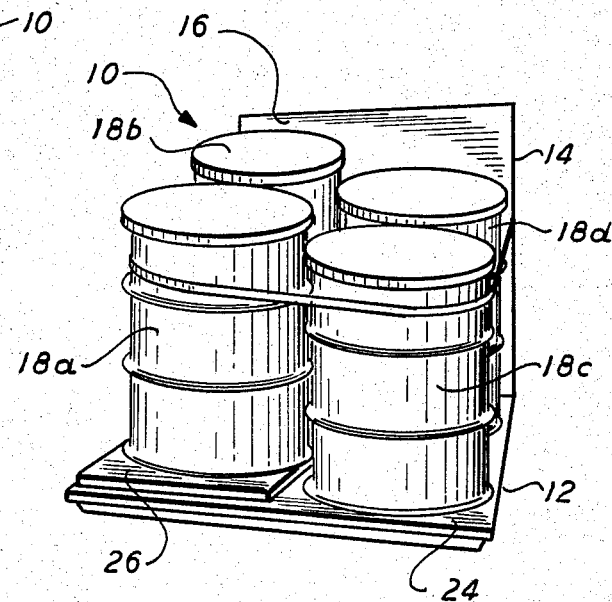
FIG. 1B is a front end perspective view of the device of FIG. 1.

The cargo restraining device 10 of FIGS. 1A and 1B comprises generally a platform member 12, supported in spaced relation from an underlying floor, and having an upper load bearing surface for receiving a cargo load thereupon. An upright member, generally designated at 14, is joined to one end of platform member 12, for effecting restraining contact with the adjacent side of the load seated on the platform member. The upright member includes a generally planar member 16, which faces the load.

The cargo load for which the present device 10 is especially adapted is a plurality of container drums 18, which are usually of the open head variety, such that each such drum is provided with a removable lid 20, which where same closes with drum 18, normally provides a somewhat enlarged chime 22, i.e. at the upper-most end of the drum. The present device 10 is particularly adapted to hold four such drums 18a, 18b, 19c, and 18d, as is illustrated in FIGS. 1A and 1B.

In accordance with a particular aspect of the present invention, it is seen that the load bearing surface of member 12 is stepped so as to define first and second generally planar load bearing portions 24 and 26, with the latter being stepped to a higher level than the former. Thus, as is apparent especially from FIG. 1B, the two drums 18c and 18d at the right side of the figure, are maintained at a slightly lower level than the two drums 18a and 18b at the left side of the Figure. The consequence of this arrangement, as has been previously indicated, is that the topmost portions of drums 18c and 18d are beneath the level of drums 18a and 18b, in consequence of which side-to-side movement of the drums will not cause the uppermost portions, such as the chimes 22 to impact laterally against the adjacent line of drums with danger of consequent dislodgement of the covers 20.

The device 10 preferably includes as well at least one strap retaining means 30 which is secured to the member 14 and passes about the drum load to secure same firmly against the face 16 of member 14.

The platform member 12 is seen more generally to be formed from a plurality of horizontal support beams 32, 34, and 36. The main horizontal support piece 38 (FIG. 2) is welded to these beams and includes bent over lateral portions 40.

A platform 42, which defines the stepped upper support surface 26, is secured as by welding or the like, to one lateral side of support surface 38. As seen in FIG. 2, platform 42 is provided with transverse reinforcing pieces 44, which lend rigidity to the load bearing surface 26 defined by the platform.

The platform 42 can actually be mounted on either the right or left hand side of the device 10. This is suggested in FIG. 3, where an alternate positioning for the platform is shown by the shadow lines 42'.

The upright member 14 is seen to include, in addition to the planar member 16, a plurality of vertical members 46, 48, 50, and 52, gussets 54, and a support piece 56. The member 16 is formed over the vertical members 46, 48, etc., as seen at 60.

Figure 4:
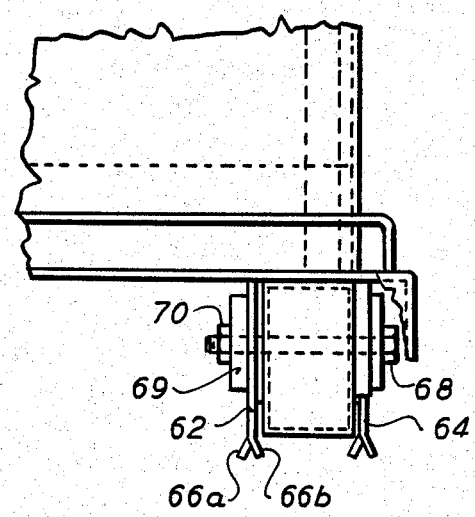
FIG. 4 is an enlarged view of the lower right corner of FIG. 3, further illustrating the floor gripping means.
Figure 5:
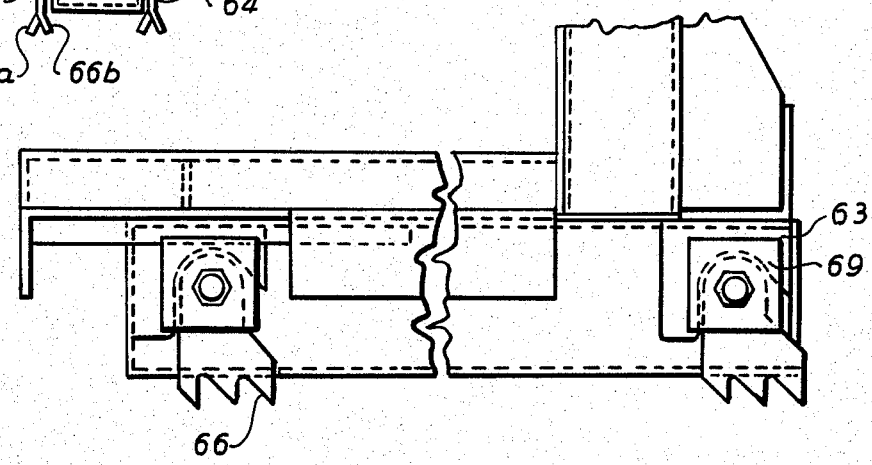
FIG. 5 is an enlarged fragmentary elevation view of the platform member and floor gripping means.

It will be seen that the present device 10 is provided with a plurality of floor gripping projections, preferably in the form of appropriately shaped teeth or the like, which are provided at the horizontal support members 32, 34, and 36. More specifically, it is seen, referring especially to FIGS. 4 and 5, that cleat plates 62 and 64 are provided, which carry at their bottommost edges, a plurality of sawtooth shaped teeth 66. Plates 62 and 64 are retained within cleat guides 63, which are welded to the members 32, 34, etc., and are secured by bolts 68, washers 69, and nuts 70. As seen in FIG. 4, the teeth 66 at the bottom of a particular plate may be bent to alternate sides of the vertical plane, i.e. successive teeth 66a, 66b, are so bent in the row of teeth so as to introduce additional stability tending to preclude side-to-side or lateral swaying of the load seated upon the cargo restraining device.

It is seen that sets of these sawtooth shaped teeth are provided at each end of the horizontal members 32, 34, and 36, to produce a total of six such sets of teeth.

It will be clear that the arrangement of the sawtooth shaped teeth is such as to sharply limit displacement of the restraining device carrying the load in a rearward direction, i.e. movement toward the right in the sense of FIG. 2. Under such circumstances, the sawtooth shaped teeth will dig into the underlying support floor.

A further feature of the present invention is set forth in the embodiment of the invention appearing in FIGS. 6 through 8. The device shown therein is in all respects identical with the embodiment set forth in the prior figures, except that in this instance a pair of receiving pockets 72 and 74 are provided, which are mounted beneath the support platform 38, and include openings 76 and 78, accessible from the rear side of device 10, i.e. from the right hand side of FIG. 7. These pockets 72 and 74 are seen to be symmetrically positioned with respect to the lateral sides of device 10, and are utilized to receive the forks of a conventional forklift device, so that when the said forklift is used to move the present restraining device, i.e. in association with open head shipping drums, the said loaded device will be precluded from tipping off the forklift forks, which can occasionally occur in the absence of the present improvement, and present a most hazardous circumstance.

The receiving pockets can also be utilized in connection with a cargo restraining device as in FIGS. 1A and 1B, but wherein the cargo support surface is not stepped, but rather is generally planar.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A device for securely restraining open head shipping drums during vehicular transport, comprising:
   a platform member supported in spaced relation from an underlying floor, and having an upper load bearing surface for receiving a cargo load thereupon;
   an upright member being adjoined to one end of said platform member for effecting restraining contact with the adjacent side of the load seated on said platform member; said upright member including a generally planar member facing said load; and
   said upper load bearing surface of said platform member being stepped to define first and second generally planar support levels at alternate sides of said platform member, whereby drums respectively supported on said first and second levels are precluded from impact between their respective top rims upon side-to-side movement or swaying thereof.

2. A device in accordance with claim 1 including downwardly facing surface gripping projections at the bottom of said device, to limit movement of said device and load with respect to the underlying floor.

3. A device in accordance with claim 2 wherein said surface gripping projections comprise generally sawtooth shaped teeth.

4. A device in accordance with claim 2, wherein said projections comprise teeth provided on metal plates which are secured to said platform member.

5. A device in accordance with claim 4, wherein the teeth are formed as rows at the lateral edge of the metal plate in contact with the underlying floor.

6. A device in accordance with claims 4 or 5, wherein the teeth are generally sawtoothed in shaped.

7. A device in accordance with claim 1, further including a pair of receiving pockets mounted below said load bearing surface and having openings facing the rear of said upright member, said openings being adapted to receive forklift forks to prevent the device from tipping off the said forks during movement of same by a tow motor.

* * * * *